United States Patent Office 3,576,865
Patented Apr. 27, 1971

3,576,865
FLUORENONE-, FLUORENOL-, AND FLUORENE-BIS-BASIC CARBOXAMIDES
Robert W. Fleming, Arthur D. Sill, and Francis William Sweet, Cincinnati, Ohio, assignors to Richardson-Merrell Inc., New York, N.Y.
No Drawing. Filed Oct. 11, 1968, Ser. No. 767,003
Int. Cl. C07c *103/30*
U.S. Cl. 260—559                                        9 Claims

ABSTRACT OF THE DISCLOSURE

Novel compounds selected from a base of the formula

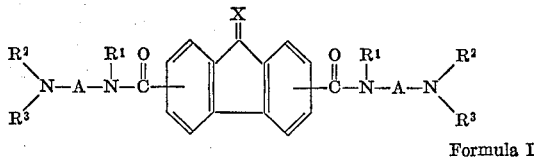

Formula I wherein: X is O; $H_2$; or H,OH; each $R^1$ is hydrogen or lower alkyl; each A is alkylene of 2 to about 8 carbon atoms and separates its adjacent nitrogen atoms by an alkylene chain of at least 2 carbon atoms; and each $R^2$ and $R^3$ is hydrogen, lower alkyl, cycloalkyl having 3 to about 6 ring carbon atoms, alkenyl of 3 to 6 carbon atoms having the vinyl unsaturation in other than the 1-position of the alkenyl group, or each set of $R^2$ and $R^3$ taken together with the nitrogen atom to which they are attached is a saturated monocyclic heterocyclic group having 4 or 5 ring carbon atoms in said heterocyclic group; or an acid addition salt of said base. The compounds can be used as anti-infective or antimicrobial agents, such as antiviral, antibacterial and antifungal agents.

---

This invention relates to novel fluorenone-, fluorenol-, and fluorene-bis-basic carboxamides of the above Formula I and methods for their preparation.

The compounds of this invention have a tricyclic ring or nucleus which is a fluorenone when X, of the above Formula I, is oxygen; fluorenol when X is OH,H; or fluorene when X is $H_2$.

It can be seen from the above Formula I that one of the carboxamide groups, or side chains, that is,

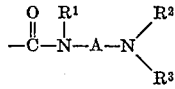

can be linked to the tricyclic ring by replacement of any of the four hydrogens of one of the benzenoid rings, and similarly, the second carboxamide group is attached to the second benzenoid ring. Thus, one of the carboxamide groups can be in any of the positions of 1 through 4 of the tricyclic ring and the other can be in any of the positions 5 through 8. Preferably, the carboxamide groups are in the 2- and 7-positions, respectively, of the tricyclic ring.

Each of the alkylene groups as represented by "A" in the above generic Formula I is an alkylene group having from 2 to about 8 carbon atoms which can be straight chained, e.g., —CH₂—(CH₂)ₙ— wherein *n* is an integer of 1 to 7, or branched chained and which separates the amide nitrogen from the amino nitrogen by an alkylene chain of at least two carbon atoms, i.e., the amide nitrogen and amino nitrogen are not on the same carbon atom of the alkylene group. Each of the alkylene groups as represented by A can be the same or different. Preferably both of these groups are the same. Illustrative of alkylene groups as represented by A there can be mentioned: 1,2-ethylene; 1,3-propylene; 1,4-butylene; 1,5-pentylene; 1,6-hexylene; 2-methyl-1,4-butylene; 2-ethyl-1,4-butylene; 3-methyl-1,5-pentylene and the like. Preferably, A is alkylene having from 2 to 6 carbon atoms.

Each amino group, i.e.,

of Formula I, can be a primary, secondary or tertiary amino group. Each of $R^2$ and $R^3$ can be hydrogen, (lower) alkyl, cycloalkyl of 3 to 6 ring carbon atoms, alkenyl of 3 to 6 carbon atoms having the vinyl unsaturation in other than the 1-position of the alkenyl group, or each set of $R^2$ and $R^3$ taken together with the nitrogen atom to which they are attached is a saturated monocyclic heterocyclic group.

The term (lower) alkyl as used herein relates to alkyls having from 1 to 6 carbon atoms.

Illustrative of (lower)alkyls as can be represented by each $R^2$, $R^3$ or $R^1$ there can be mentioned straight or branched chain alkyls such as: methyl; ethyl; n-propyl; isopropyl; n-butyl; secondary butyl; tertiary butyl; isoamyl; n-pentyl; n-hexyl; and the like.

Illustrative of cycloalkyl groups as represented by each of $R^2$ and $R^3$ there can be mentioned: cyclopropyl; cyclobutyl; cyclopentyl; cyclohexyl; and the like.

When $R^2$ or $R^3$ represent alkenyl groups, the vinyl unsaturation is in other than the 1-position of said alkenyl group. Illustrative of alkenyl groups as can be represented by each of $R^2$ and $R^3$ there can be mentioned: allyl; 3-butenyl; 4-hexenyl; and the like.

Illustrative of heterocyclic groups represented by $R^2$ and $R^3$, together with the nitrogen atom to which they are attached, there can be mentioned various saturated monocyclic heterocyclic groups such as those generally equivalent to di(lower) alkylamino groups in the pharmaceutical arts, e.g., pyrrolidino, piperidino, morpholino, N-(lower) alkyl-piperazino such as N-methylpiperazino; N-ethylpiperazino; and the like.

Each $R^2$ and $R^3$ group can be the same or different on each of the side chains of the tricyclic ring. Thus, one of the $R^2$ groups can be alkyl whereas the other can be cycloalkyl, both $R^2$ groups can be alkyl and one or both of the $R^3$ groups can be alkenyl, one set of $R^2$ and $R^3$ together with the nitrogen to which they are attached can be a heterocycle whereas each of the remaining $R^2$ and $R^3$ can be alkyl. Further, other variations can be made. Preferably, however, both of the $R^2$ groups are the same and both of the $R^3$ groups are the same. Preferred substituents for the $R^2$ and $R^3$ groups are the (lower) alkyls, which again can be the same or different alkyl radicals, but particularly the same radical for the total of the four $R^2$ and $R^3$ groups.

Each of the $R^1$ groups can be hydrogen or (lower) alkyl and such substituents can be the same or different for the two $R^1$ groups. Preferably, both $R^1$ groups are the same and particularly when both $R^1$ groups are hydrogen, Illustrative of the fluorenone compounds of this invention there can be mentioned:

N,N'-bis(4-aminobutyl)-9-oxofluorene-2,7-dicarboxamide;
N,N'-bis(5-aminopentyl)-9-oxofluorene-2,7-dicarboxamide;
N,N'-bis(4-aminobutyl)-9-oxofluorene-2,5-dicarboxamide;
N,N'-bis(4-aminobutyl)-9-oxofluorene-1,7-dicarboxamide;
N,N'-bis(2-diethylaminoethyl)-9-oxofluorene-2,7-dicarboxamide;
N,N'-bis(3-diethylaminopropyl)-9-oxofluorene-2,7-dicarboxamide;
N,N'-bis(3-dibutylaminopropyl)-9-oxofluorene-2,7-dicarboxamide;
N,N'-bis(3-dibutylaminopropyl)-9-oxofluorene-1,7-dicarboxamide;
N,N'-bis(3-dipropylaminopropyl)-9-oxofluorene-4,5-dicarboxamide;
N,N'-bis(3-dibutylaminopropyl)-9-oxofluorene-2,5-dicarboxamide;
N,N'-bis(3-dimethylaminopropyl)-9-oxofluorene-1,6-dicarboxamide;
N,N'-bis(5-dipropylaminopentyl)-9-oxofluorene-1,5-dicarboxamide;
N,N'-bis(3-dipentylaminopropyl)-9-oxofluorene-1,7-dicarboxamide;
N,N'-bis(3-dibutylaminopropyl)-9-oxofluorene-3,6-dicarboxamide;
N,N'-bis(2-dipropylaminoethyl)-9-oxofluorene-1,6-dicarboxamide;
N,N'-bis(4-ethylaminobutyl)-9-oxofluorene-2,7-dicarboxamide;
N,N'-bis(3-cyclohexylaminopropyl)-9-oxofluorene-2,5-dicarboxamide;
N,N'-bis(3-dibutylaminopropyl)-9-oxofluorene-1,6-dicarboxamide;
N,N'-bis(3-diallylaminopropyl)-9-oxofluorene-2,7-dicarboxamide;
N,N'-bis(3-pyrrolidinopropyl)-9-oxofluorene-2,7-dicarboxamide and the like; or acid addition salts of the above base compounds. Illustrative of fluorene and fluorenol compounds there can be mentioned those corresponding to the above enumerated fluorenones.

Preferred compounds of this invention are those wherein the carboxamide groups are in the 2,7-position of the tricyclic ring and which can be represented by the formula:

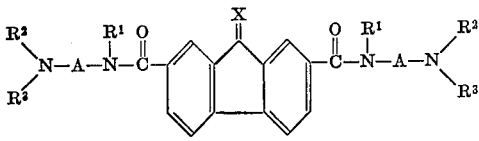

wherein: A is alkylene of 2 to 6 carbon atoms; each of $R^2$ and $R^3$ is alkyl, particularly of 1 to 5 carbon atoms; $R^1$ is hydrogen, and X is carbonyl oxygen, H, OH or $H_2$, or acid addition salts thereof.

Salts of the base compounds of this invention are primarily pharmacologically acceptable acid addition salts with inorganic or organic acids. However, for some of the purposes of this invention, e.g., disinfectant or antiseptic use, the salt need not be pharmacologically acceptable. Suitable inorganic acids are, for example, mineral acids, such as hydrohalic acids, e.g., hydrochloric or hydrobromic acid, or sulfuric or phosphoric acids. Organic acids are, for example, lower aliphatic hydroxy-hydrocarbon monocarboxylic acids, e.g., glycolic or lactic acid and the like, lower aliphatic lower alkoxy-hydrocarbon monocarboxylic acids, e.g., methoxy-acetic or ethoxy-acetic acids and the like, lower aliphatic lower alkanoyl-hydrocarbon monocarboxylic acids, e.g., pyruvic acid and the like, lower aliphatic hydrocarbon dicarboxylic acids, e.g., oxalic, malonic, succinic, methylsuccinic, dimethylsuccinic, glutaric, α-methylglutaric, β-methylglutaric, itaconic, maleic, citraconic, homocitraconic, or fumaric acid and the like, lower aliphatic hydroxy-hydrocarbon dicarboxylic acids, e.g., malic or tartaric acid and the like, lower aliphatic lower alkoxy-hydrocarbon dicarboxylic acids, e.g., α,β-dimethoxysuccinic or ethoxymaleic acid and the like, lower aliphatic hydrocarbon tricarboxylic acids, e.g., aconitic or tricarballylic acid and the like, lower aliphatic hydroxy-hydrocarbon tricarboxylic acids, e.g., citric acid and the like. Furthermore, organic sulfonic acids, such as lower alkane sulfonic acids, e.g., methane sulfonic or ethane sulfonic acid and the like, or lower hydroxy-alkane sulfonic acids, e.g., 2-hydroxy-ethane sulfonic acid and the like, may be suitable. Particularly useful are pharmacologically acceptable acid addition salts with mineral acids, e.g., hydrochloric acid. Mono or di-acid salts may be formed; also, the salts can be hydrated, e.g., monohydrate, or substantially anhydrous.

The compounds of this invention can be used as anti-infective or antimicrobial agents such as antiviral, antibacterial or antifungal agents. For such use, the compounds are placed in contact with the various microorganisms or the locus of the infection. The quantity of novel compound used will be dependent upon the microorganism for which inhibition, treatment or prophylaxis is desired, the type of material or animal involved, and the nature of the effect desired. The novel compounds together with conventional pharmaceutical carriers can be administered to warm blooded animals by conventional methods such as topical application, e.g., in an ointment or emulsion, or in various unit dosage forms.

For disinfectant or antiseptic use, e.g., disinfecting of surgical instruments, animal watering troughs, animal cages, and so forth, the compounds of this invention can be dispersed in an inert finely divided solid, for example, diatomaceous earth, and employed as a dust in concentrations which can vary over a wide range such as about 0.01% to 3% by weight of inert finely divided solids, or they can be dispersed in water or oil with or without a wetting, dispersing or emulsifying agent over a wide range of concentrations such as about 0.01% to 3% by weight of water or oil to prepare germicidal suspensions or emulsions or solutions which can be used, for example, by spraying or dipping to inhibit the growth of microorganisms. Illustrative of bacteria or fungi which have been inhibited or destroyed, in vitro, with the compounds of this invention, there can be mentioned *Staphylococcus aureus*, *Salmonella schottmuelleri*, and *Candida albicans*.

The novel compounds of this invention can be used to prevent or treat a wide variety of infections caused by viruses. Illustratively, the compounds can be used for their antiviral effect against picornavirus types, myxoviruses, poxviruses, and the like. For antiviral use in warm blooded animals, a compound of this invention either alone, but preferably with a significant quantity of a pharmaceutical carrier, can be employed in unit dosage forms such as liquid solutions for parenteral use. Such unit dosages can contain from about 1 to 250 mg. of a compound of this invention. The daily dosage can vary over a wide range such as from about less than 1 mg. to over 250 mg. per kg. of animal weight.

The fluorene and fluorenone compounds of this invention can be prepared by reacting, in the presence or absence of a condensing agent, a fluorene or fluorenone dicarboxylic acid or a reactive derivative thereof, such as a halide, ester or azolide of the formula

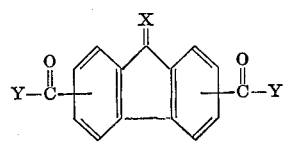

wherein $X=H_2$ or O and $Y=$halogen, e.g., chlorine, lower alkoxy, e.g., methoxy, azolide or the like, with an aminoalkylamine of the formula

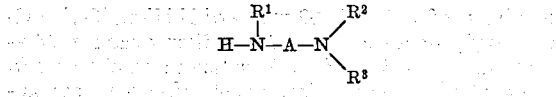

wherein each of $R^1$, $R^2$, $R^3$ and A have the same meaning as in Formula I.

Thus, condensation may be effected by heating the fluorene or fluorenone dicarboxylic acid with an excess of amine to a temperature of 100–250° to cause amide formation. If necessary, additional amine may be added and the process continued.

The condensation may be effected by reacting the fluorene or fluorenone dicarbonyl chloride with an amine (2 or more moles of the amine per mole of the dicarbonyl chloride). The reaction may be run in the presence or absence of an inert solvent in which the acid chloride has partial solubility, e.g., chloroform, tetrahydrofuran, etc., which is dry and free of alcohols. The reaction may be run at temperatures from 20° to the reflux temperature of the solvent for 1–24 hours. Preferably, the reaction is run for two hours at the reflux temperature of the solvent.

The condenation may be effected by reacting the fluorene or fluorenone dicarboxylic ester with an amine (2 or more moles of the amine per mole of the dicarboxylic ester), at temperatures from 25–200° with or without a solvent for 1 to 100 hours. Alcohols, polyols, dichlorobenzene, etc., may be used as solvents for the reaction.

The condensation may be effected by reacting the fluorene or fluorenone dicarboxylic azolide with an amine (2 or more moles per mole of the dicarboxylic azolide), at temperatures from 25 to 175° with or without an aprotic solvent for 1–24 hours. Typical azolides which might be used are the imidazolides, 1,2,3-triazolides, etc.

The primary and secondary amino derivatives (i.e., those in which $R^1$, $R^2$ and $R^3=$hydrogen or where $R^1=R^2=$a substituent other than hydrogen and $R^3=$hydrogen), can be prepared as described above if the aminoalkylamine is used in large excess (at least 6 moles of diamine for 1 mole of bis acid or bis acid derivative). Alternately, the primary and secondary amino derivatives can be prepared by one of the above methods by the use of an aminoalkylamine in which one of the amino groups is substituted with a readily removable blocking group such as trifluoroacetyl, carbobenzoxy and the like. After the preparation of the bis amide, the blocking group is removed by a suitable technique such as by treatment with mild base, anhydrous hydrobromic acid, etc.

Alternately, the fluorene and fluorenone compounds of this invention may be prepared by converting their corresponding dicarboxylic acids into their haloalkyl derivatives of the formula

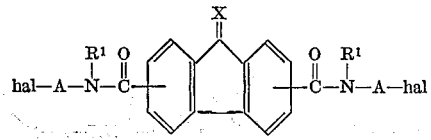

wherein hal is halogen, e.g., chlorine, and X, $R^1$ and A are as previously defined. These haloalkyl derivatives are then caused to react with an amine of the formula

wherein $R^2$ and $R^3$ are as defined above. In the case where $R^2$ and $R^3$ are both hydrogen, the haloalkyl derivative may be reacted with hexamethylenetetramine followed by decomposition with strong acid to give the primary amino derivatives.

The condensation may be effected by reacting the fluorene or fluorenone bis haloalkyl amide with an amine with or without a catalyst such as potassium iodide and with or without a suitable solvent such as ethanol for 3 to 72 hours at 50 to 150° C. Where a temperature greater than the boiling point of one of the reactants or solvent is needed, a pressure vessel is used.

The primary amino fluorene and fluorenol compounds of this invention may also be prepared by converting the corresponding dicarboxylic acids into cyanoalkyl derivatives of the formula:

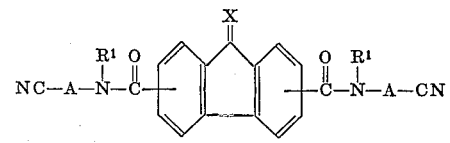

wherein X, $R^1$ and A are as previously defined. These cyano-alkyl derivatives are then reduced to the primary amino derivative such as by hydrogenation over a catalyst such as platinum oxide, Raney nickel, etc. at 25–75° for 3 to 72 hours with a suitable solvent such as ethanol, acetic acid, etc., at hydrogen pressures of about 60 p.s.i. or lower. Ammonia may be used with non-acidic solvents to suppress the formation of secondary and tertiary amine by-products.

The fluorenol derivatives of this invention can be prepared by reduction of the corresponding fluorenone derivatives chemically (such as with sodium borohydride, lithium borohydride, etc., at 20–100° C. for 10 minutes to 4 hours in a suitable solvent such as water, ethanol, etc.), or catalytically with hydrogen over a catalyst such as platinum oxide, palladium on charcoal, etc., in a suitable solvent such as water, ethanol, etc., until the theoretical amount of hydrogen is taken up. The reaction is normally carried out at ambient temperature. The fluorene derivatives can also be prepared by catalytic reduction of the corresponding fluorenols or fluorenones.

The fluorene compounds of this invention can be oxidized to the corresponding fluorenone derivatives such as by passing oxygen through a solution of the fluorene derivative in a suitable solvent such as pyridine with a basic catalyst such as Triton B for 15 minutes to 8 hours.

The following examples are illustrative of the invention.

EXAMPLE 1

Preparation of N,N'-bis(2-diisopropylaminoethyl)-9-oxofluorene-2,7-dicarboxamide dihydrochloride A mixture of 61.0 g. (0.20 mole) of 9-oxofluorene-2,7-dicarbonyl chloride and 57.7 g. (0.40 mole of N,N-diisopropyl ethylene diamine in two liters of chloroform (ethanol-free and dried over molecular sieves) was refluxed with stirring for two hours. The mixture was evaporated to dryness and the residue dissolved in water. The solution was made acid to congo red with concentrated HCl and filtered. The filtrate was extracted with ether and the aqueous layer made alkaline with 10% NaOH solution. The resulting mixture was extracted three times with chloroform, the chloroform extracts combined, washed with water, with saturated NaCl solution and then dried over $MgSO_4$. This mixture was filtered and the filtrate acidified to congo red with ethereal HCl. The solid which formed was filtered off, washed with ether and air dried, M.P. 267–271° (dec.). The subject product was recrystallized three times from ethanol with enough water added to complete solution and was then dried at 110° for six hours under high vacuum. M.P. 287–288° (dec.), $\lambda^{water}_{max.}$ 274 m$\mu$, $E^{1\%}_{1 cm.}$ 1470

In a similar manner as that of Example 1, the following compounds were prepared wherein each of $R^2$, $R^3$, $R^1$ and A have the generic meanings given hereinbefore.

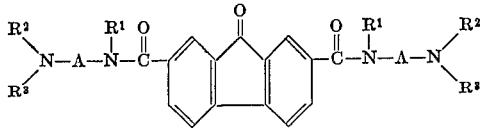

(The numbers under "No." in the following table, as well as the tables following Examples 2 and 3, simply refer to compound numbers and not to examples.)

| Number | $R^1$ | A | $-N\begin{smallmatrix}R^2\\R^3\end{smallmatrix}$ | M.P. (°C.) | $\lambda_{max.}$ (m$\mu$)[1] | $E_{1 cm.}^{1\%}$[1] |
|---|---|---|---|---|---|---|
| 1 [2] | H | $(CH_2)_2$ | $N(CH_3)_2 \cdot HCl$ | [3] 270–272 | 274 | 1,690 |
| 2 [4] | H | $(CH_2)_2$ | $N(C_2H_5)_2 \cdot HCl$ | [3] 264.5–265.5 | 274 | 1,550 |
| 3 | $CH_3$ | $(CH_2)_2$ | $N(C_2H_5)_2 \cdot C_6H_8O_7$ | [3] 141–143 | 268 | 757 |
| 5 | H | $(CH_2)_2$ | $-N\diagup\diagdown O \cdot HCl$ | [3] 297–298 | 274 | 1,500 |
| 6 [4] | H | $(CH_2)_3$ | $N(CH_3)_2 \cdot HCl$ | [3] 298–299 | 273 | 1,610 |
| 7 | H | $(CH_2)_3$ | $N(C_2H_5)_2 \cdot HCl$ | 274–275 | 273 | 1,470 |
| 8 [5] | $CH_3$ | $(CH_2)_3$ | $N(C_2H_5)_2 \cdot C_6H_8O_7$ | [3] 104–108 | 266 | 706 |
| 9 | H | $(CH_2)_3$ | $N(CH_2CH=CH_2)_2 \cdot HCl$ | 207.5–209.5 | 273 | 1,400 |
| 10 [4] | H | $(CH_2)_3$ | $N(C_4H_9)_2 \cdot HCl$ | 222–224.5 | 273 | 1,240 |
| 11 | H | $(CH_2)_3$ | $N[CH_2CH_2CH(CH_3)_2]_2 \cdot HCl$ | 219–220.5 | 273 | 1,150 |
| 12 | H | $(CH_2)_6$ | $N(C_2H_5)_2 \cdot HCl$ | [3] 248–250 | 273 | 1,280 |

[1] In water.
[2] Monohydrate.
[3] Decomposition.
[4] Hemihydrate.
[5] 2½ moles water.

EXAMPLE 2

Preparation of N,N'-bis(2-diisopropylaminoethyl)-9-hydroxy fluorene-2,7-dicarboxamide A solution of 2.3 g. (0.06 mole) of sodium borohydride in 15 ml. of water was added dropwise with vigorous stirring to a solution of 11.9 g. (0.02 mole) of N,N'-bis(2 - diisopropylaminoethyl - 9 - oxofluorene - 2,7-dicarboxamide dihydrochloride. The solution became colorless and a white gummy solid precipitated. The mixture was stirred for 15 minutes and then acidified to congo red with concentrated HCl. The resulting solution was stirred for another 15 minutes and filtered. The filtrate was made alkaline with 20% NaOH solution and the white precipitate which formed was filtered off, washed with water and air dried. M.P. 232–239°. The subject product was recrystallized twice from methanol and dried 24 hours at room temperature under high vacuum. M.P. 236–239° (dec.), $$\lambda_{max.}^{EtOH}\ 303\ m\mu,\ E_{1\ cm.}^{1\%}\ 575$$

In a similar manner as that in Example 2, the following compounds were prepared wherein $R^2$, $R^3$ and A have the meanings given hereinbefore.

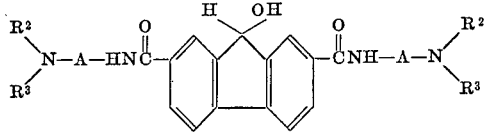

EXAMPLE 3

Preparation of N,N'-bis(6-diethylaminohexyl) fluorene-2,7-dicarboxamide dihydrochloride A mixture of 13.0 g. (0.02 mole) of N,N'-bis(6-diethylaminohexyl)-9-oxofluorene - 2,7 - dicarboxamide dihydrochloride and 4.5 g. of 10% pallidium on charcoal in 250 ml. of water was hydrogenated using the Paar apparatus for three hours at room temperature and then for 30 hours at 52°. The mixture was cooled, the supernatant decanted and filtered through filter aid. The filtrate was made alkaline with 10% NaOH solution and the resulting solid filtered and washed with water. This material was dissolved in methylene chloride, the solution dried over $MgSO_4$ and filtered. The filtrate was acidified to congo red with etheral HCl and treated with anhydrous ether. The gummy solid which formed was separated, dissolved in absolute ethanol and reprecipitated with anhydrous ether. The solid subject product which formed was filtered, washed with anhydrous ether and air dried. M.P. 173–178° (dec.). This product was recrystallized three times from butanone with enough ethanol added to complete solution. The product was dried at 100° for six hours under high vacuum. M.P. 174–176°, $$\lambda_{max.}^{water}\ 309\ m\mu,\ E_{1\ cm.}^{1\%}\ 545$$

In a similar manner as in Example 3, the following compounds were obtained:

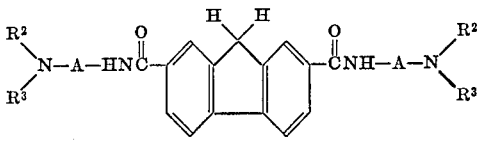

| Number | A | $-N\begin{smallmatrix}R^2\\R^3\end{smallmatrix}$ | M.P. (°C.) | $\lambda_{max.}$ (m$\mu$) | Solvent | $E_{1\ cm.}^{1\%}$ |
|---|---|---|---|---|---|---|
| 14 | $(CH_2)_3$ | $N(C_2H_5)_2$ | 187–190 | 300 | Methanol | 651 |
| 15 [1] | $(CH_2)_3$ | $N[CH_2CH_2CH(CH_3)_2]_2$ | 162–164 | 300 | Ethanol | 470 |
| 16 [2] | $(CH_2)_6$ | $N(C_2H_5)_2 \cdot HCl$ | [3] 216–218 | 300 | 0.1 N HCl | 478 |

[1] Monohydrate.
[2] 1.2% water.
[3] Decomposition.

| Number | A | R² / R³ (—N<R²/R³) | M.P. (°C.) | λmax. (mμ) | Solvent | $E_{1\ cm}^{1\%}$ |
|---|---|---|---|---|---|---|
| 17 | (CH₂)₂ | N[CH(CH₃)₂]₂·HCl | ¹ 263–264 | 312 | Water | 619 |
| 18 | (CH₂)₃ | N(C₂H₅)₂·HCl | ¹ 168–170 | 310 | ___do___ | 611 |
| 19 | (CH₂)₃ | N[CH₂CH₂CH(CH₃)₂]₂·HCl | 202.5–203.5 | 310 | 0.1 N HCl | 482 |

¹ Decomposition.

Examples 4 to 14 illustrate in vivo antiviral studies with compounds of this invention. Each example recites pertinent information involved. Table A lists the compound which was administered in each of the examples. Although it is believed that the headings in the examples are self-explanatory, some of the headings are explained as follows: The "Challenge," i.e., inoculation with a virus, used is generally fatal to all the untreated, i.e. control, animals in the experiment. "Time of death" refers to the average time of death for the untreated animals. The "treatment" was prophylactic or therapeutic or both. The term "volume" refers to the volume of composition administered per dose which contained the active ingredient (novel compound) dissolved in sterile water which also contained 0.15% of hydroxyethylcellulose. The control animals received a sham dosage of the same volume of the vehicle which did not contain the active ingredient. The abbreviation "STR" is survival time ratio, which is calculated by dividing the mean day of death of the control animals into the means day of death of the treated animals during the period of observation. The activity of the compound in the example involved is further characterized, e.g., low, medium, high, etc. A survival time ratio (STR) of less than 0.90 indicates that the compound was toxic; a ratio of 0.90 to 1.09 indicates that there is no activity; a ratio of 1.10 to 1.19 indicates low or weak activity; a ratio of 1.20 to 1.29 indicates medium activity; and a ratio of 1.30 and greater indicates high activity.

TABLE A

| Example: | Active ingredient |
|---|---|
| 4–9 | N,N'-bis (3-di (n) butylaminopropyl)-9-oxofluorene-2,7-dicarboxamide dihydrochloride hemihydrate. |
| 10 | N,N'-bis (2-diisopropylaminoethyl)-9-oxofluorene-2,7-dicarboxamide dihydrochloride. |
| 11 | N,N'-bis (3-dimethylaminopropyl)-9-1xofluorene-2,7-dicarboxamide dihydrochloride hemihydrate. |
| 12 | N,N'-bis (2-diisopropylaminoethyl) fluorene-2,7-dicarboxamide dihydrochloride. |
| 13 | N,N'-bis (3-diallylaminopropyl)-9-oxofluorene-2,7-dicarboxamide dihyerochloride. |
| 14 | N,N'-bis (6-diethylaminohexyl) fluorene-2,7-dicarboxamide dihydrochloride. |

| Example | 4 | 5 | 6 | 7 |
|---|---|---|---|---|
| Virus: | Encephalomyocarditis | Encephalomyocariditis | Mengo | Equine influenza. |
| Type | RNA, Picornavirus | RNA, Picornavirus | RNA, Picornavirus | RNA, Myxovirus. |
| Challenge | 4 LD₅₀ | 10–100 LD₅₀ | 10 LD₅₀ | 68 LD₅₀. |
| Route | Subcutaneous | Intraperitoneal | Subcutaneous | Intranasal. |
| Time of death, days | 5 | 5 | 5 | 5 |
| Period of observation, days | 10 | 10 | 10 | 10 |
| Animal: | Mice | Mice | Mice | Mice |
| Weight, grams | 12–15 | 12–15 | 12–15 | 12–15 |
| Number in treated group | 10 | 10 | 10 | 5 |
| Number in control groups | 30 | 10 | 20 | 5 |
| Treatment: | Prophylactic and therapeutic. | Prophylactic and therapeutic. | Prophylactic and therapeutic. | Prophylactic and therapeutic. |
| Dosage level, mg./kg. | 250 | 50 | 50 | 50 |
| Route | Subcutaneous | Oral | Subcutaneous | Subcutaneous. |
| Volume, ml. | 0.25 | 0.25 | 0.25 | 0.25 |
| Time: | | | | |
| Pre-challenge, hours | 28, 22, 4 | 28, 22, 4 | 28, 22, 4 | 28, 22, 4 |
| Post-challenge, hours | 2, 20, 26 | 2, 20, 26 | 2, 20, 26 | 2, 20, 26 |
| Results: | | | | |
| STR | 1.61 | 1.28 | 1.56 | 1.20 |
| Activity | High | Medium | High | Medium. |

| Example | 8 | 9 | 10 | 11 |
|---|---|---|---|---|
| Virus: | PR₈ Influenza | Vaccina, IHD | Encephalomyocarditis | Encephalomyocarditis. |
| Type | RNA, Myxovirus | DNA, Poxvirus | RNA, Picornavirus | RNA, Picornavirus. |
| Challenge | 0.22 LD₅₀ | 31 ID₅₀ | 18 LD₅₀ | 13 LD₅₀. |
| Route | Intranasal, non-fatal infection, with lungs bioassayed for virus. | Subcutaneous in tail, tail lesion scored on 7th day. | Subcutaneous | Subcutaneous. |
| Time of death, days | | | 5 | 5 |
| Period of observation, days | 10 | 10 | 10 | 10 |
| Animal: | Mice | Mice | Mice | Mice. |
| Weight, grams | 12–15 | 15 | 12–15 | 12–15 |
| Number in treated group | 5 | 10 | 10 | 10 |
| Number in control group | 5 | 20 | 30 | 20 |
| Treatment: | Prophylactic and therapeutic. | Prophylactic and therapeutic. | Prophylactic and therapeutic. | Prophylactic and therapeutic. |
| Dosage level, mg./kg. | 10 | 50 | 10 | 0.4 |
| Route | Subcutaneous | Subcutaneous | Subcutaneous | Subcutaneous. |
| Volume, ml. | 0.25 | 0.25 | 0.25 | 0.25 |
| Time: | | | | |
| Pre-challenge, hours | 28, 22, 2 | 28, 22, 2 | 28, 22, 2 | 28, 22, 4 |
| Post-challenge, hours | 2, 20, 26 | 2, 20, 26 | 2, 20, 26 | 2, 20, 26 |
| Results: | | | | |
| STR | Survival time ratio for bioassay=1.15. | (¹) | 1.25 | 1.19 |
| Activity | Active | High activity | Medium | Low. |

| Example | 12 | 13 | 14 |
| --- | --- | --- | --- |
| Virus: | Encephalomyocarditis | Encephalomyocarditis | Encephalomyocardit |
| Type | RNA, Picornavirus | RNA, Picornavirus | RNA, Picornavirus. |
| Challenge | 7 LD$_{50}$ | 13 LD$_{50}$ | 18 LD$_{50}$. |
| Route | Subcutaneous | Subcutaneous | Subcutaneous. |
| Time of death, days | 5 | 5 | 5 |
| Period of observation, dzys | 10 | 10 | 10 |
| Animal: | Mice | Mice | Mice. |
| Weight, grams | 12-15 | 12-15 | 12-15 |
| Number in treated group | 10 | 10 | 10 |
| Number in control group | 30 | 30 | 30 |
| Treatment: | Prophylactic and therapeutic | Prophylactic and therapeutic | Prophylactic and therapeutic. |
| Dosage level, mg./kg. | 50 | 50 | 2 |
| Route | Subcutaneous | Subcutaneous | Subcutaneous. |
| Volume, ml | 0.25 | 0.25 | 0.25 |
| Time: | | | |
| Pre-challenge, hours | 28, 22, 2 | 28, 22, 2 | 28, 22, 2 |
| Post-challenge, hours | 2, 20, 24 | 2, 20, 24 | 2, 20, 26 |
| Results: | | | |
| STR | 1.57 | 1.38 | 1.32 |
| Activity | High | High | High. |

[1] Treated lesion score 0 / Control lesion score 1.6. = 0.0

EXAMPLE 15

By the method of Example 1, using the appropriate starting materials, the following compounds can be prepared:

N,N' - Bis(3-piperidinopropyl) - 9 - oxofluorene - 2,7 - dicarboxamide dihydrochloride N,N' - Bis(4 - pyrrolidinobutyl) - 9 - oxofluorene - 2,7-dicarboxamide dihydrochloride N,N' - Bis[3 - (N - methyl-N-cyclohexylamino)propyl]-9-oxofluorene-2,7-dicarboxamide dihydrochloride

EXAMPLE 16

By the method of Example 2, using the appropriate starting materials, the following compounds can be prepared:

N,N' - Bis(3 - piperidinopropyl) - 9 - hydroxyfluorene-2,7-dicarboxamide

N,N' - Bis(4 - pyrrolidinobutyl) - 9 - hydroxyfluorene-2,7-dicarboxamide

N,N'-Bis[3-(N - methyl - N - cyclohexylamino)propyl]-9-hydroxyfluorene-2,7-dicarboxamide

EXAMPLE 17

By the method of Example 3, using the appropriate starting materials, the following compounds can be prepared:

N,N' - Bis(3 - piperidinopropyl)fluorene - 2,7-dicarboxamide dihydrochloride

N,N' - Bis(4 - pyrrolidinobutyl)fluorene - 2,7-dicarboxamide dihydrochloride

N,N' - Bis[3 - (N - methyl-N-cyclohexylamino)propyl]fluorene-2,7-dicarboxamide dihydrochloride

EXAMPLE 18

In a manner similar to that of Examples 4-14, the compound N,N'-bis(3 - diisopentylaminopropyl) - 9 - hydroxyfluorene-2,7-dicarboxamide monohydrate was tested for antiviral activity in mice against encephalomyocarditis. Medium antiviral activity was found by subcutaneously administering the compound at a dosage of 2 mg. (milligrams) per kg. (kilogram) of body weight 28, 22 and 2 hours before infection with 13 times the LD$_{50}$ of encephalomyocarditis and again administering the compound at 2, 22 and 26 hours after the infection. The observation period for the treated mice was for nine days after infection.

EXAMPLE 19

Preparation of N,N' - bis(3-aminopropyl)9-oxofluorene-2,7-dicarboxamide dihydrochloride This compound can be prepared by the method of Example 1 using a ratio of 10 moles of 1,3-propanediamine per mole of 9-oxofluorene-2,7-dicarbonyl chloride as the starting materials.

EXAMPLE 20

Preparation of N,N' - bis(3 - methylaminopropyl)-N,N'-dimethyl - 9 - oxofluorene-2,7-dicarboxamide dihydrochloride This compound can be prepared by the method of Example 19 by substituting an equimolar amount of N,N'-dimethyl-1,3-propanediamine for the 1,3-propanediamine used in that example.

What is claimed is:

1. A compound selected from a base of the formula

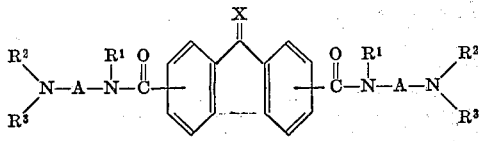

wherein: X is O; H$_2$; or H, OH; each R$^1$ is hydrogen or lower alkyl; each A is alkylene of 2 to about 8 carbon atoms and separates its adjacent nitrogen atoms by an alkylene chain of at least 2 carbon atoms; and each of R$^2$ and R$^3$ is hydrogen, lower alkyl, cycloalkyl having 3 to about 6 ring carbon atoms, alkenyl of 3 to 6 carbon atoms having the vinyl unsaturation in other than the 1-position of the alkenyl group, or each set of R$^2$ and R$^3$ taken together with the nitrogen atom to which they are attached is pyrrolidino, piperidino, N-(lower) alkylpiperazino, or morpholine; or an acid addition salt of said base, and with the proviso that the carboxamide groups are in the 2- and 7-positions of the tricyclic ring.

2. A compound of claim 1 wherein: X is oxygen; each R$^1$ is hydrogen; each A is alkylene of 2 to 6 carbon atoms; and each of R$^2$ and R$^3$ is lower alkyl of 1 to 5 carbon atoms.

3. A compound of claim 1 wherein: X is H$_2$; each R$^1$ is hydrogen; each A is alkylene of 2 to 6 carbon atoms; and each of R$^2$ and R$^3$ is lower alkyl of 1 to 5 carbon atoms.

4. A compound of claim 1 wherein: X is H, OH; each $R^1$ is hydrogen; each of $R^2$ and $R^3$ is alkyl of 1 to 5 carbon atoms; and each A is alkylene of 2 to 6 carbon atoms.

5. N,N' - bis(3 - dibutylaminopropyl) - 9-oxofluorene-2,7-dicarboxamide or a pharmacologically acceptable acid addition salt thereof.

6. N,N' - bis(3 - diallylaminopropyl)-9-oxofluorene-2,7-dicarboxamide or a pharmacologically acceptable acid addition salt thereof.

7. N,N' - bis(2 - diisopropylaminoethyl) fluorene-2,7-dicarboxamide or a pharmacologically acceptable acid addition salt thereof.

8. N,N' - bis(6 - diethylaminohexyl) fluorene-2,7-dicarboxamide or a pharmacologically acceptable acid addition salt thereof.

9. N,N'-bis(3-diisopentylaminopropyl) - 9 - hydroxyfluorene - 2,7-dicarboxamide or a pharmacologically acceptable acid addition salt thereof.

No references cited.

HENRY R. JILES, Primary Examiner

H. I. MOATZ, Assistant Examiner

U.S. Cl. X.R.

424—324; 260—247.2, 268, 294, 326.85, 558

UNITED STATES PATENT OFFICE
CERTIFICATE OF CORRECTION

Patent No. 3,576,865    Dated April 24, 1971

Inventor(s) Robert W. Fleming
Arthur D. Sill and Francis W. Sweet

It is certified that error appears in the above-identified patent and that said Letters Patent are hereby corrected as shown below:

Column 5, line 26, "condenation" should read --condensatio
Column 10, line 30, "9-lxofluorene" should read --9-oxoflu
ene--; line 33, "d8hyerchloride" should read --dihydrochlo
Columns 9 and 10, Example 9 - Treatment post challenge,
"2,20,26 hrs." should read --2,22,26 hrs.--; column 12, li
"Encephalomyocardit" should read --Encephalomyocarditis--;
Column 12, line 66, "morpholene" should read --morpholino- Signed and sealed this 1st day of August 1972.

(SEAL)
Attest:

EDWARD M. FLETCHER, JR.
Attesting Officer

ROBERT GOTTSCHALK
Commissioner of Patents